H. HUNDRIESER.
DRILL.
APPLICATION FILED NOV. 30, 1912.
Patented Jan. 6, 1914.
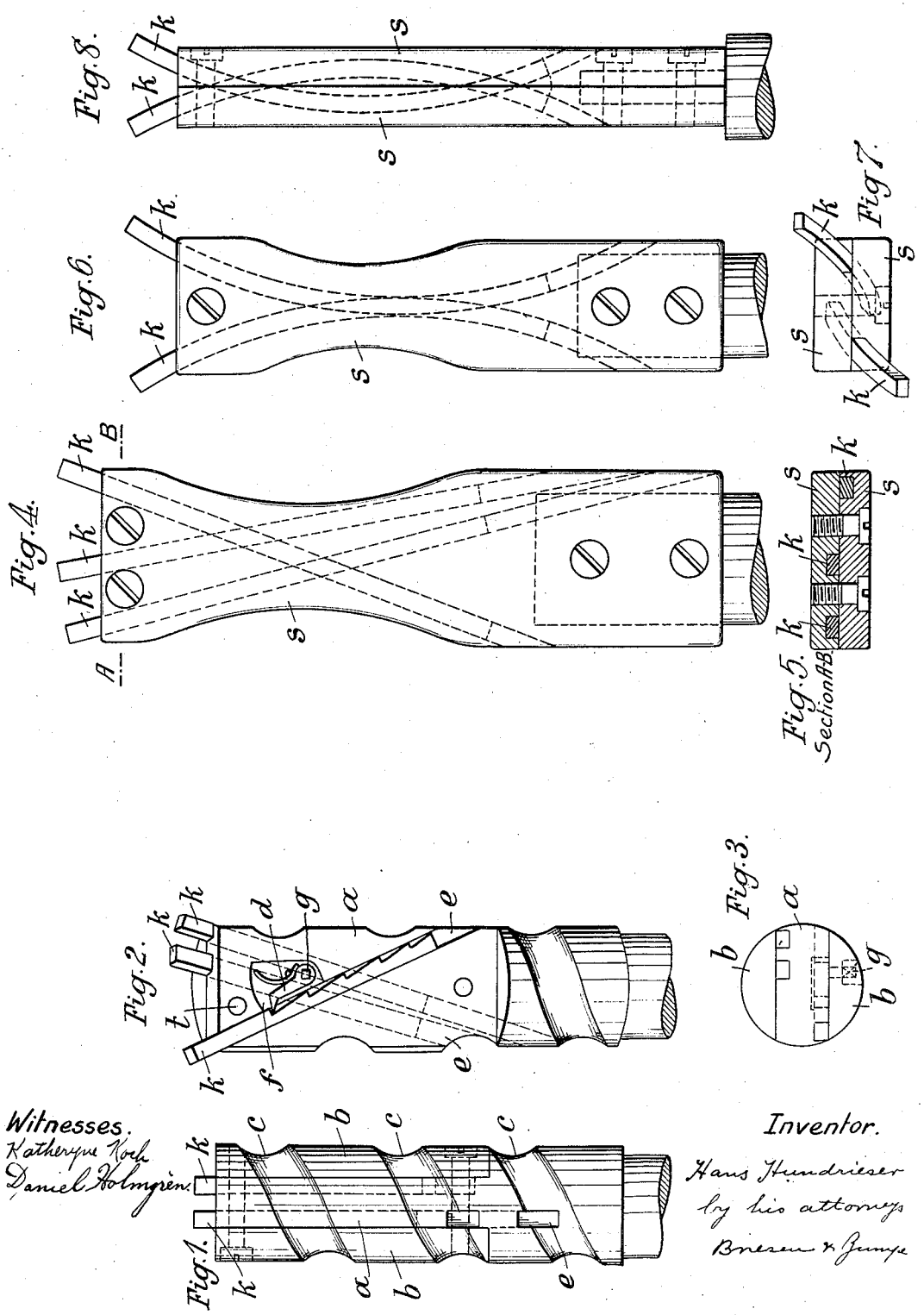

UNITED STATES PATENT OFFICE.

HANS HUNDRIESER, OF HALENSEE, NEAR BERLIN, GERMANY.

DRILL.

1,083,492.      Specification of Letters Patent.      Patented Jan. 6, 1914.

Application filed November 30, 1912. Serial No. 734,256.

*To all whom it may concern:*

Be it known that I, HANS HUNDRIESER, sculptor, a subject of the King of Prussia, residing at Joachim-Friedrich strasse 10$^B$, Halensee, near Berlin, Germany, have invented certain new and useful Improvements in Drills; and I do hereby declare the following to be a full, clear, and exact description of the invention, such as will enable others skilled in the art to which it appertains to make and use the same.

My invention relates to a stone drill, by which all kinds of stones, beton and other hard natural or artificial products may easily be worked.

The drills of usual construction have all more or less the great disadvantage that in order to adjust or to exchange the cutters certain securing organs have to be loosened and then after adjustment or exchange have to be secured again.

The improvement obtained by the present invention consists in providing a drill head into which cutters may be fitted or out of which they may be removed easily and without loosening of any securing organ merely by pushing the cutter into a slot of the drill head by hand or by pulling it out on the opposite side respectively, as well as by adjusting the cutter after being worn out merely by pulling it out to the desired length. For this purpose a pawl is situated in the interior of the drill head and on one part accepts the working pressure while it on the other part readily disengages the cutters for the above said movements.

Referring to the accompanying drawings Figure 1 is a side view of the drill head with 3 cutters, Fig. 2 is a perspective view of the same with removed front side piece, turned about its vertical axis through an angle of 90° and tilted a little out of the plane of the drawing. Fig. 3 is an upper plan view. Fig. 4 is an elevation of the drill with rectangular section, Fig. 5 is a section on the line A—B of Fig. 4 and Figs. 6, 7 and 8 are elevations of the drill head showing circularly curved cutters or slots respectively.

As shown in Figs. 1 and 2 the drill head consists of the middle part $a$ and the two side-pieces or cheeks $b$, $b$. This division however is merely afforded in order to enable one to work out the slots $e$ and the recesses $f$; have these once been made and the pawl $d$ been mounted, the side-pieces or cheeks are laid against the middle part $a$ and secured in any suitable manner by means of rivets or screws with countersunk heads, passing through the holes $t$. The whole of the drill head is further provided with spiral slots $c$ on its outer surface in order to convey the refuse material. The pawl $d$ is situated in the recess $f$ of part $a$ and is secured to the axle $g$. The latter may penetrate one of the side-pieces $b$ and may at this end be of square section so as to be actuated by a square spanner and, if desired, disconnect the pawl $d$. In order to put in a cutter $k$ the latter is pushed with its front end into the rear opening of the slot $e$ and is then shifted in the same whereby the pawl snaps into the notches of the cutter. Has the latter by mistake been pushed too far the pawl can be disengaged by the means described above and the cutter then shifted back one or two notches. The pawl $d$ receives the pressure of the cutter when working.

In Figs. 4 and 5 a drill head of rectangular section is shown in which the spiral slots $c$ of Fig. 1 are done away with, as owing to the flat form of the drill head the refuse material can easily be removed out of the boring hole.

In Figs. 6, 7 and 8 the same drill head is shown as in Figs. 4 and 5. Here however the cutters are circularly curved and accordingly the slots have also such a shape, the plates $s$, $s$ hereby being connected together by means of rivets or screws.

Having thus fully described my invention what I claim as new and desire to secure by Letters Patent is:

1. A drill comprising a head having an obliquely extending bore, and a recess communicating with said bore, a longitudinally adjustable tool accommodated within said bore and provided with a rack facing the head-recess, and a spring-influenced pawl pivoted to the head within the recess and adapted to engage the rack.

2. A drill comprising a head composed of a first section having a groove and a recess communicating with the groove, a tool having a rack and slidable within the groove; a spring-influenced pawl pivotally mounted within the recess and engaging the rack, and a second head-section secured to the first named section and confining the tool within the groove.

HANS HUNDRIESER.

Witnesses:
 WOLDEMAR HAUPT,
 HENRY HASPER.